Patented June 17, 1930

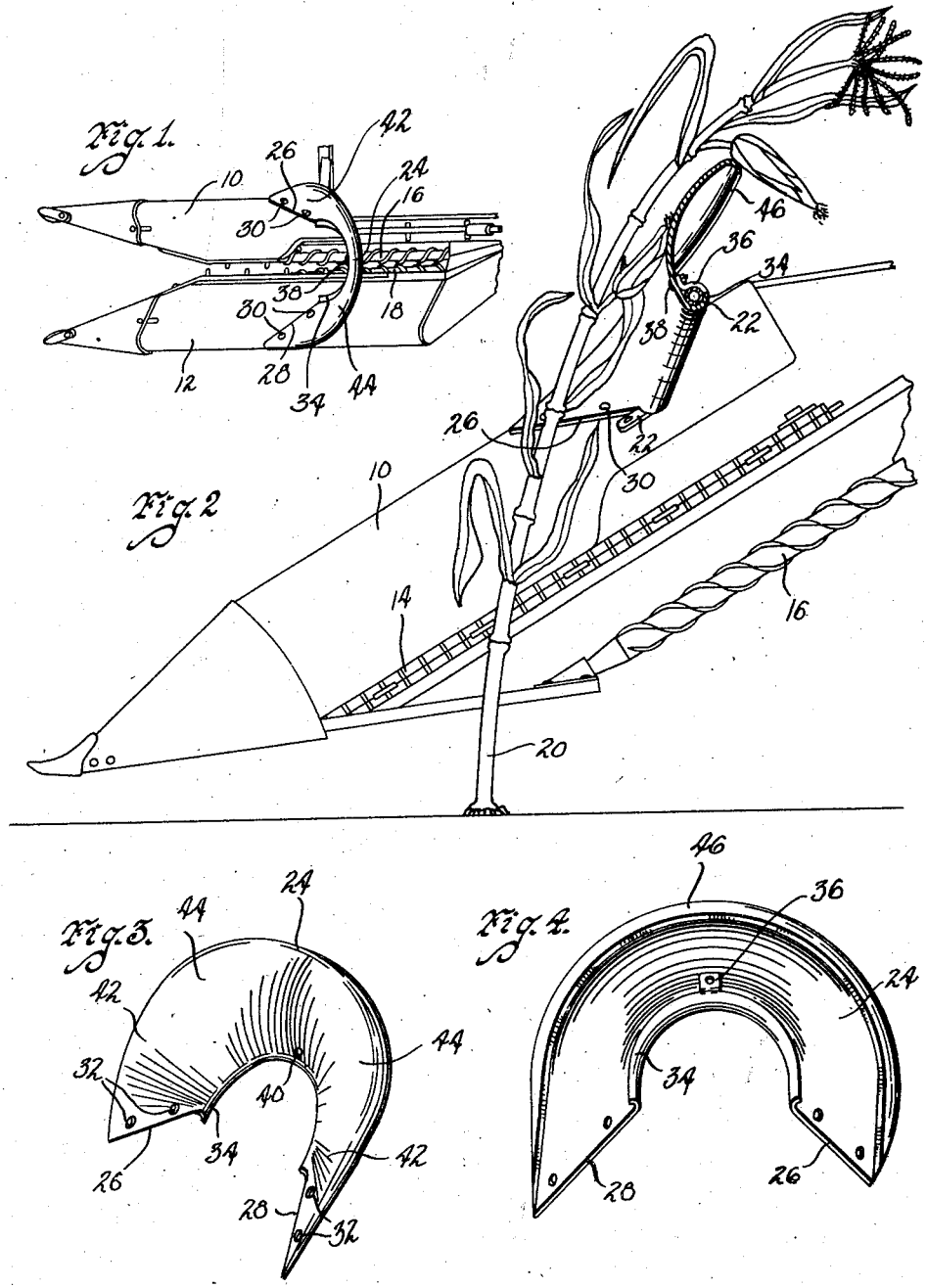

1,764,947

UNITED STATES PATENT OFFICE

JOHN W. FRANK, OF MILO, IOWA

ATTACHMENT FOR CORN-PICKING MACHINES

Application filed November 26, 1928. Serial No. 321,912.

The object of this invention is to provide an improved attachment for corn picking machines especially designed for facilitating the proper positioning of corn stalks for engagement by the snapping rolls of the machine.

More specifically, this invention relates to and has for its object the provision for an improved attachment for corn picking machines, which attachment is in the nature of a shield and guide spanning the space between the divider boards for the purpose of engaging stalks of corn and raising them to a position where they will occupy a substantially vertical plane longitudinally of the line of draft of the machine.

A further object of the invention is to provide improved means for properly positioning stalks of corn and preventing the knocking off and loss of ears of corn which may be carried by unusually tall stalks or by stalks which are in more or less prostrate position.

Still another object of the invention is to provide an attachment of the character described which is economical to manufacture, easily installed and which is durable and efficient in use.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a plan view of a portion of a corn picking machine having my improved attachment thereon.

Figure 2 is a sectional elevation centrally of the space between the divider boards and illustrating the action of my improved attachment in properly positioning a stalk of corn for engagement by the snapping rolls.

Figure 3 is a perspective view of my improved attachment removed from the machine.

Figure 4 is a rear elevation of the same.

This attachment is designed for use with a corn picking machine including spaced divider boards 10 and 12, which slope upwardly and rearwardly and also are inclined outwardly, whereby a substantially inclined trough-shaped construction is provided. The divider boards carry gathering chains 14, one of which is shown in Figure 2, and between the divider boards, a pair of inclined snapping rolls 16 and 18 are mounted.

The machine is caused to travel over a corn field with the divider boards 10 and 12 straddling a row of corn stalks such as 20, which stalks are engaged by the points of the divider boards and by the boards themselves as well as by the gathering chains 14 for causing the stalks to assume a proper upright position between the snapping rolls 16 and 18 which act to remove the ears from the stalks as the machine is advanced. Such machines usually include also, a yoke-shaped or arched bar 22 which is fixed to the upper rear portions of the divider boards and spans the space between them.

In some instances, the yoke-shaped or arched bar is carried by the harvester frame and extends up through or around the dividing boards, but in any case it serves to brace and prevent undue spreading of the divider boards, frame and rolls.

In the use of machines of this character, trouble is sometimes experienced in getting the corn stalks into proper position for ultimate engagement by the snapping rolls, particularly where the stalks are of unusual height or are in more or less of prostrate position.

My improvement is designed particularly to overcome the difficulty just mentioned and to facilitate the proper positioning of the stalks so that ears of corn will not be knocked off by being permitted to droop over the upper rear portions of the divider boards, the yoke, or other elements of the machine. This end is accomplished by the use of an apron or guiding member of substantially semi-annular shape which is mounted so as to bridge the space at the upper part of the divider boards.

The apron or guiding member may be formed integrally of sheet metal or of other suitable material and it is designated generally by the numeral 24.

The apron or guiding member 24 is of curved or substantially semi-annular shape and it has two lower margins, formed on inclined lines which I have designated by the numerals 26 and 28.

The apron 24 is arranged across the upper or rear portions of the divider boards 10 and 12 with its inclined margins 26 and 28 contacting with the upper or forward surfaces of said boards and preferably arranged on inclined lines transversely thereof.

The apron or guiding member 24 may be attached to the divider boards by means of bolts or the like 30 extending through holes 32 in the apron and through registering holes in the divider boards.

The apron or guiding member 24 preferably is arranged immediately in front of and so as to be partially supported by the yoke 22 of the machine and the lower curved margin of the apron preferably is provided with a roll or hook flange 34 designed to extend beneath and partially embrace said yoke, as shown in Figure 2. At its center, the hook flange 34 may be formed with an apertured ear 36 which extends behind and around the yoke 22. A bolt 38 is mounted through the apertured ear 36 and through a hole 40 in the lower central part of the apron, whereby the apron or guiding member may be securely clamped to the yoke.

At both sides, the apron 24 has a gradual upward and rearward slope from its inclined lower edges 26 and 28, whereby slightly concaved surfaces 42 are produced, and thence the apron is curved somewhat outwardly so as to present somewhat convex surfaces 44, between which the apron assumes at its central part, a substantially vertical position.

In use, stalks of corn such as 20 after having been first engaged by the points and the body portions of the divider boards 10 and 12, are engaged by the lower forward portions of the apron 24. This is particularly true in cases where the corn stalks are leaning to one side or the other, which positions might be caused because of adverse weather conditions preceding corn picking time and which conditions might be accentuated by unusual development of the corn as to length of stalks or heavy yield of ears carried thereby.

When such conditions occur, the stalks are engaged by one side or the other of the apron in the advance of the machine and the concaved portions 42, followed by the gradual slopes, whereby they merge into the convex portions 44 and finally into the substantially vertical central portion, cause the stalks to assume practically upright positions in a vertical plane centrally and longitudinally of the space between the snapping rolls 16 and 18.

Inasmuch as the apron or guiding member rises to a greater height than the yoke 22 or other parts of the machine as ordinarily constructed, it follows that an additional support is provided for the corn stalks, particularly those of greater height, as is clearly illustrated in Figure 2.

The action of my improved attachment prevents the stalks from lopping or dropping sidewise over the divider boards and keeps the ears thereon from being contacted by the upper ends of the divider boards or by other elements of the machine. In other words the apron or guiding member serves to bring the stalks gradually to substantially upright position and to support them in a vertical plane between the snapping rolls and to prevent the ears of corn from being knocked off and lost.

By the use of this attachment I have found that the corn picking operation by a mechanical picking machine is greatly facilitated and the loss of ears is considerably reduced, particularly where there is a considerable quantity of "down" corn or where the stalks are of unusual growth and yield.

The upper or outer margin of the apron or guide member 24 preferably is turned rearwardly in the form of a semi-roll or hook flange 46, which serves to strengthen the device, to give it a finished appearance and also to present a curved surface for engagement by the stalks and ears of corn.

It is obvious that variations may be made in the size, shape and configuration of the apron or guiding member as well as the method of mounting it on the machine without departing from the principle whereby the curved surface is presented which gradually merges from the surfaces of the divider boards into a substantially vertical plane centrally of the space therebetween.

I claim as my invention:

1. An attachment for a corn picking machine having spaced divider boards inclined laterally and rearwardly, comprising an apron and guiding member of substantially semi-annular shape and having its end portions attached to the respective divider boards and extending rearwardly and upwardly on gradual curves, the lower forward surfaces of such end portions having substantially concaved faces merging upwardly and rearwardly into convex faces; the central part of said member between said convex faces being arranged in substantially upright position, whereby corn stalks may be raised from laterally reclining to substantially vertical positions in the advance of the machine.

2. An attachment for a corn picking machine having spaced divider boards inclined laterally and rearwardly and also having a yoke mounted on and connecting said divider boards, comprising an apron and guiding member of substantially semi-annular shape and having its end portions attached to the respective divider boards and extending rearwardly and upwardly on gradual curves, the central part of said member being arranged in substantially upright position, whereby corn stalks may be raised from laterally reclining to substantially vertical positions in the advance of the machine, said apron being formed on its lower margin with a rolled flange extending beneath and partially embracing said yoke.

3. An attachment for a corn picking machine having spaced divider boards inclined laterally and rearwardly and also having a yoke mounted on and connecting said divider boards, comprising an apron and guiding member of substantially semi-annular shape and having its end portions attached to the respective divider boards and extending rearwardly and upwardly on gradual curves, the central part of said member being arranged in substantially upright position, whereby corn stalks may be raised from laterally reclining to substantially vertical positions in the advance of the machine, said apron being formed on its lower margin with a rolled flange extending beneath and partially embracing said yoke, together with an apertured ear on said flange extending past said yoke and bolted to the body of the apron and guiding member.

Des Moines, Iowa, November 14, 1928.

JOHN W. FRANK.